Patented Sept. 6, 1949

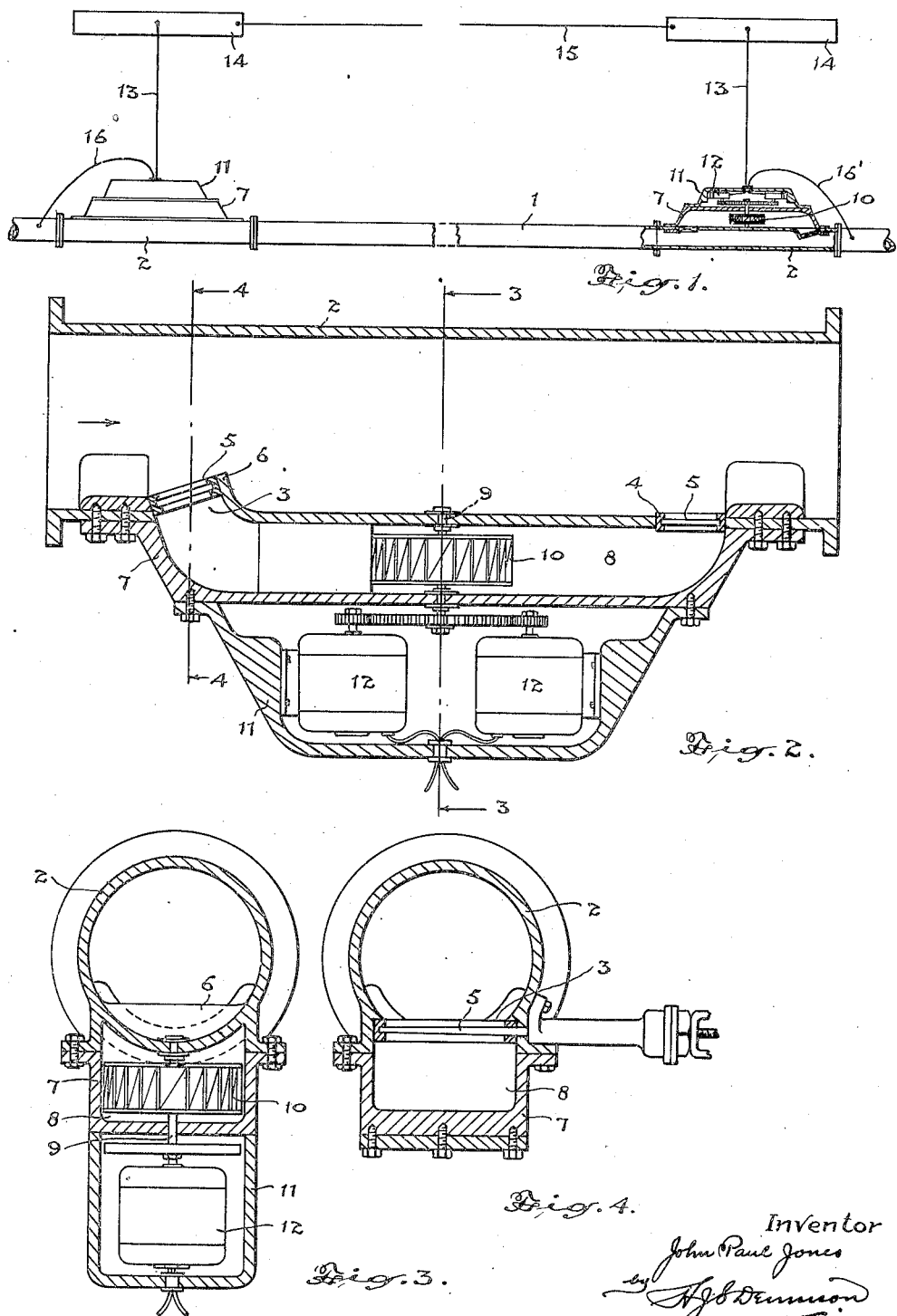

2,481,222

UNITED STATES PATENT OFFICE 2,481,222

TURBOGENERATOR

John Paul Jones, Toronto, Ontario, Canada

Application May 9, 1945, Serial No. 592,901

3 Claims. (Cl. 290—52)

The present invention is directed to the protection of pipe lines such as water mains, oil pipe lines, well casings or any metal pipe buried in the ground from the deteriorating effect of corrosion through electrolysis and the principal object of the invention is to devise an economical means of affording cathodic protection to such buried pipe lines.

A further object is to devise a construction of device which will utilize the flow of liquid through the pipe line to develop the necessary electrical current to afford such cathodic protection.

A still further object is to devise a construction of apparatus which may be readily repaired or replaced without interfering with the normal flow of liquid through the pipe line.

The principal feature of the invention consists in providing a pipe line with individual power units in which suitable electrical generators are driven by turbines operated by the flow of liquid through the pipe line, said power unit being capable of being detached from the pipe line to give access to the equipment, the flow of liquid through the auxiliary power device being controlled by valves incorporated in the pipe line.

In the accompanying drawings Figure 1 is a diagrammatic part sectional view showing cathodic protection installation on a pipe line.

Figure 2 is an enlarged longitudinal sectional elevation of a section of pipe line and a cathodic protection power generating unit connected therewith.

Figure 3 is a transverse section of the device taken through the line 3—3 of Figure 2.

Figure 4 is a transverse sectional view of the device taken through the line 4—4 of Figure 3.

It has long been known that iron or steel pipe lines buried in the ground are subject to deterioration through the effect of electrolysis and it has been thoroughly established that the maintenance of the flow of electric current through the pipe line to provide cathodic protection affords a very efficient means of reducing electrolysis and corrosion.

It has however been found difficult if not impossible to afford such protection to pipe lines because of the difficulty and expense of installing and maintaining electric power development stations and feed lines. Consequently the cathodic principle of protecting pipe lines has not been widely used.

The application of the invention as illustrated in the accompanying drawings the pipe line 1 is provided at suitable intervals throughout its length with special unit insert pipes 2 which are formed with openings 3 and 4 arranged adjacent to the ends thereof. Each of these openings is provided with a suitable form of shut-off valve 5 here shown in the form of a gate valve which may be operated to be opened or closed from the outside of the pipe.

An inwardly projecting lip 6 is preferably formed in the pipe section 2 on the inner side of the opening 3 in order to place the valve in a slightly angular position for a purpose which will hereinafter appear.

Attached to the outward side of the pipe 2 and enclosing both openings 3 and 4 is a casing 7 which encloses a passage 8 extending parallel with the pipe 2 and forming a communicating passage between the openings 3 and 4.

Arranged substantially mid-way of the length of the passage 8 and mounted in suitable bearings is a shaft 9 extending transversely of the passage and upon which is mounted a suitable turbine wheel 10. The interior contour of the passage 8 will be suitably shaped to direct the flow of liquid passing through the passage 8 to drive the turbine.

A casing 11 is secured to the outward side of the casing 7 in a manner so that it may be readily detached therefrom and within the chamber enclosed by this casing is arranged one or more electrical generators 12 of a suitable type.

Suitable gearing is arranged between the shaft 9 and the drive shafts of the generators 12 to drive the generators at a required speed through the operation of the turbine mounted in the passage 8.

The positive lead from each of the generators is connected by a conductor cable 13 to a length of iron or steel, such as a piece of scrap pipe or railway rail, which is buried in the ground at a suitable distance from the pipe line. The length of such grounding members will be approximately fifteen to twenty feet and the distance they will be placed from the pipe line will depend upon the nature of the soil in which the pipe line is buried.

These grounding members 14 will be connected together in series by suitable conductor wires 15.

The negative pole of each of the generators will be connected by the conductors 16 to the pipe line 1.

The direction of flow of liquid through the pipe line 1 is indicated by the arrow in Figure 2 and when the gate valves 5 are open fluid will flow through the opening 3 and passage 8 and this flow is returned to the pipe line through the opening 4. The fluid in passage through the passage 8 rotates the turbine wheel 10 and thus operates the generators 12. The nature and capacity of these generators will be determined by the variable factors of pipe line conductivity, soil etc. They will be spaced apart throughout the length of the pipe line at suitable distances to establish a flow of electric current from the generators to the ground distributors 14 and back through ground to the pipe line.

This direction of a positive current flow through the ground to the cathode formed by the pipe line eliminates the setting up of local electrical circuits which would result in destructive electrolysis.

The principle of protection of the pipe line by cathodic influence is well established and the present invention is directed to the novel arrangement of local power stations arranged throughout the pipe line utilizing the force of the flowing liquid through the pipe line to develop the necessary power to cover the stretches of pipe extending between the stations.

The power used adds very little to the necessary pumping power and the small local units are arranged in such a manner that they can be shut off from the pipe line to enable repairs or replacements to be made without interrupting the pipe line flow.

What I claim as my invention is:

1. A turbo generator unit comprising a tubular pipe-like member defining a main fluid flow passage having spaced outlets in the wall thereof, closure valves for said outlets, a casing detachably connected to said tubular member and extending between said outlets to form in combination with the outside wall of said tubular member a secondary fluid flow passage in parallel with said main fluid flow passage, a turbine mounted on a shaft in said casing and operated by the fluid flow in said secondary passage, said shaft projecting through said casing, a second casing detachably connected to said first-mentioned casing, and electric generating means secured within said second casing and operatively and detachably connected with said turbine shaft, said second casing being removable to permit access to said generating means, and said first-mentioned casing being removable with fluid flow through the main fluid passage upon closure of said valves to permit access to said turbine.

2. A device as claimed in claim 1 in which means is provided adjacent one of the outlets in said tubular pipe-like member for inducing a flow of fluid through said adjacent outlet concurrent with the flow through the main fluid flow passage.

3. A device as claimed in claim 1 in which the shaft of the turbine is journalled in bearings mounted in the wall of said tubular member and casing attached thereto respectively, the shaft extending through the latter wall and carrying a gear, the outer casing connected to said first-mentioned casing forming a sealed enclosure for the electrical generator unit, said generator unit being geared to the aforesaid gear.

JOHN PAUL JONES.

REFERENCES CITED

The following references are of record in the file of this patent:

UNITED STATES PATENTS

| Number | Name | Date |
| --- | --- | --- |
| 525,304 | Woods | Aug. 28, 1894 |
| 1,992,003 | Cook | Feb. 19, 1935 |
| 2,127,315 | Thayer | Aug. 16, 1938 |
| 2,246,472 | Sharp | June 17, 1941 |
| 2,266,355 | Chun | Dec. 16, 1941 |
| 2,276,714 | Brown | Mar. 17, 1942 |
| 2,299,406 | Potter | Oct. 20, 1942 |